United States Patent [19]

Myers

[11] 4,395,781

[45] Aug. 2, 1983

[54] INSECT PROTECTIVE GARMENT

[76] Inventor: Noreen Myers, 3345 Sandyshore, Metamora, Mich. 48455

[21] Appl. No.: 252,380

[22] Filed: Apr. 9, 1981

[51] Int. Cl.³ .................. A42B 3/00; A41D 10/00
[52] U.S. Cl. ............................................. 2/4; 2/84
[58] Field of Search ................................. 2/84, 4

[56] References Cited

U.S. PATENT DOCUMENTS 2,365,656 12/1944 Lamsa ............................................. 2/4
2,717,437 9/1955 DeMestral ........................ 2/DIG. 6

Primary Examiner—Doris L. Troutman
Attorney, Agent, or Firm—Basile, Weintraub & Hanlon

[57] ABSTRACT

An insect proof coverall garment is disclosed. The garment of the present invention is made from a lightweight insect excluding material covering the user's body and limbs with a releasable fastener extending from the user's hips to the neck to aid in putting the garment on and removing the garment. The garment includes a hood attached at the neck to cover the head of the user with an open face portion. The perimeter of the face opening is lined with a VELCRO material so that an insect or other small animal excluding mesh may be releasably attached thereto to protect the head and face of the user from insects or other small animals. The face mesh is readily removable for access to the user's mouth. Openings are formed at the shoulders, elbows and knees, and these openings are covered with an insect excluding mesh to provide ventilation along with maximum flexibility and comfort.

10 Claims, 4 Drawing Figures

INSECT PROTECTIVE GARMENT

BACKGROUND OF THE INVENTION

I. Field of the Invention

The present invention generally relates to the field of protective clothing and, in particular, the present invention is concerned with protective clothing to protect the user from insects.

II. Description of the Prior Art

Protective clothing and protective garments are known in the prior art. The protective garments in the prior art are intended for protection of the wearer against the elements such as heat, cold and moisture, or to protect the head of the user from insects. Examples of protective garments in the prior art are disclosed in U.S. Pat. Nos. 1,203,155; 1,580,453; 2,365,656; 2,543,317; 2,869,132; 3,100,897; 4,023,223; 4,038,698; and 4,124,903. These patents are relevant to the Applicant's invention in that they represent the closest known prior art disclosing protective garments and the like. None of the above-identified references disclose a coverall garment to protect the user from insects with portions of the garment removed and covered with an insect excluding mesh to provide ventilation and maximum flexibility at the elbows and joints of the garment.

SUMMARY OF THE INVENTION

The present invention, which will be described in greater detail hereinafter, comprises a lightweight insect and other small animal proof coverall garment sufficiently loose and large to pass over the normal outer garments of the wearer and completely enclose the body of the wearer and protect him from insects such as flies, mosquitoes and other small animals. The garment comprises a body portion of lightweight insect excluding material covering the user's body from his shoulders to his hips. A releasable fastener extending from the hips to the neck is provided for easy donning or removal of the garment. A pair of legs of lightweight insect excluding material extend from the hips to the user's shoe tops, with a lower end of the legs abutting the shoe tops to exclude insects. A loop of elastic material is provided at a lower end of each leg extending around the arch of the user's shoe to hold the lower end of the leg in abutment with the shoe. An opening is formed at the knee of each leg with the opening covered with an insect excluding mesh to provide flexibility at the knee and ventilation for the comfort of the wearer.

The garment includes a pair of arms of lightweight insect excluding material that extend from the shoulders of the wearer to his wrists. A space is provided between the shoulder and the arm which space is covered with an insect excluding mesh for ventilation and flexibility. In a preferred embodiment, an elastic material is provided around the perimeter of the wrist to exclude insects. A space is provided at the elbow which is covered with an insect excluding mesh for ventilation and maximum flexibility.

A hood of lightweight insect excluding material is joined to the body portion at the neck and covers the user's head with an opening provided around the user's face. VELCRO material is provided around the perimeter of the face opening to releasably attach an insect excluding face covering mesh to allow the user to see and provide ventilation around the face. The VELCRO material releasably attaches the face mesh to the hood for ready access to the user's mouth for smoking, eating, etc.

It is therefore a primary object of the present invention to provide a one-piece protective garment to pass over the clothing of the user and protect the user from insects such as flies and mosquitoes.

It is a further object of the present invention to provide such a protective garment with a hood covering the head of the user.

It is yet another object of the present invention to provide a one-piece insect protective garment having a face mesh releasably attached to the hood with VELCRO material to provide ventilation and easy access to the user's mouth for eating or smoking.

It is yet another object of the present invention to provide openings at the elbows, knees, and shoulders of the garment for ventilation and maximum flexiblity, these openings being covered with an insect excluding mesh.

It is another object of the present invention to have the lower hem of the leg of the garment abutting the shoe top of the user fitted with a loop of elastic extending around the shoe of the user to hold the hem in abutment with the shoe.

Further objects, advantages, and applications of the present invention will become apparent to those skilled in the art of insect protective garments when the accompanying description of one example of the best mode contemplated for practicing the invention is read in conjunction with the accompanying drawing.

BRIEF DESCRIPTION OF THE DRAWING

In the drawing like numbers refer to like parts throughout the several views and wherein.

DESCRIPTION OF THE PREFERRED EMBODIMENT

Figure 1:
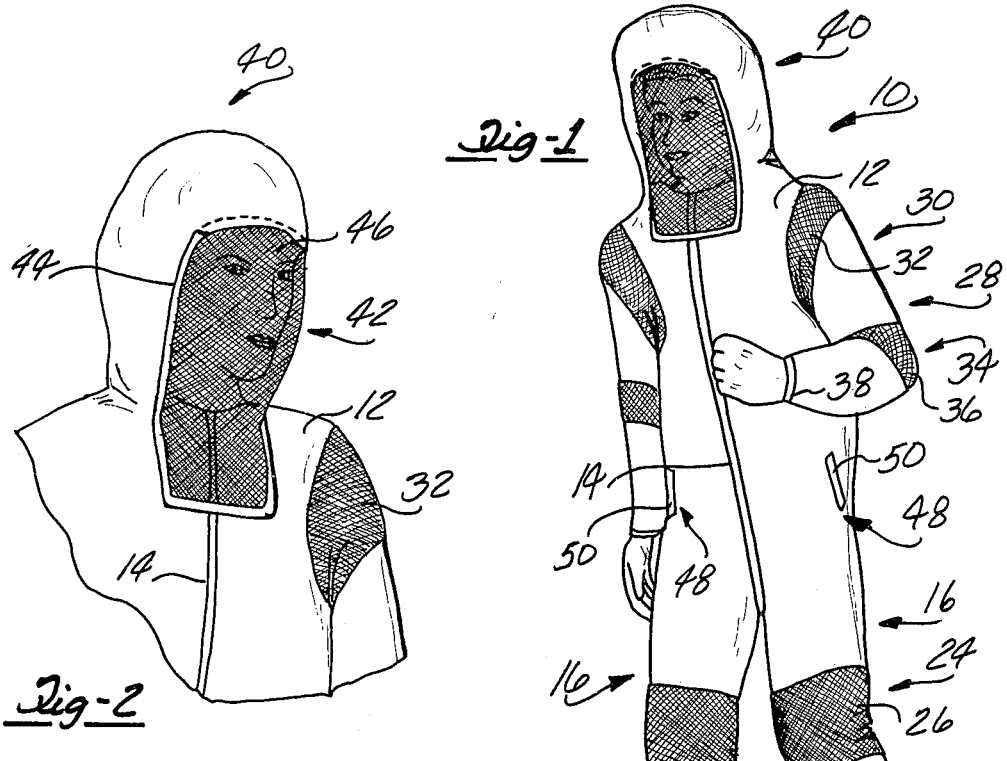
FIG. 1 illustrates a perspective view of the protective garment of the present invention.
Figure 2:
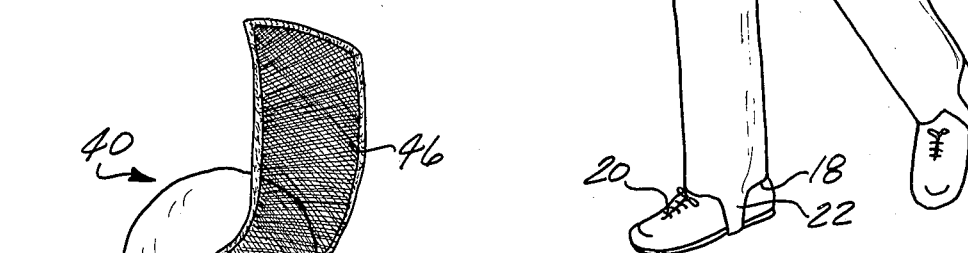
FIG. 2 illustrates a broken, perspective view of the upper portion of the garment of the present invention.
Figure 3:
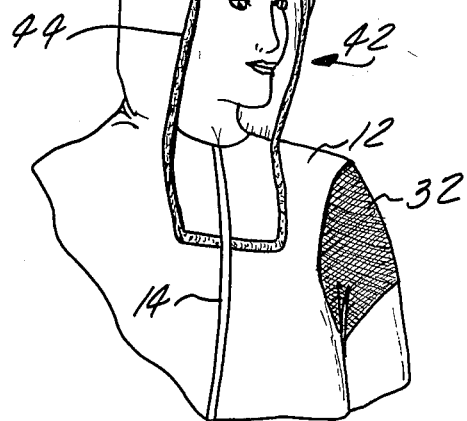
FIG. 3 illustrates the upper portion of the garment of FIG. 2 with the face mesh opened.
Figure 4:
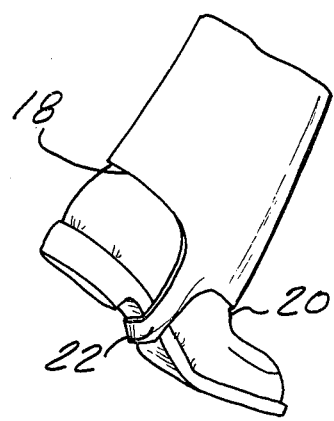
FIG. 4 illustrates a broken, perspective view of the lower portion of the leg of the garment.

Referring now to the drawing, and in particular, FIG. 1 there is illustrated at 10 one example of the present invention in the form of an insect proof coverall garment. The coverall garment 10 comprises a body portion 12 of light-weight insect excluding material covering the user's body from the shoulders to the hips with a releasable fastener 14 extending from the hips to the neck to enable the user to easily get into or out of the garment. The garment 10 is deliberately made loose fitting to enable the user to comfortably wear the garment and to provide ample room for ventilation between the user's clothing and the garment in a manner which will be more fully described subsequently.

A pair of legs 16 of lightweight insect excluding material are attached to the body portion 12 and extend from the hips to the user's shoe tops. It is preferable that the lower end 18 of each leg 16 abut the user's shoe tops 20 to exclude insects from invading between the leg 16 and the leg of the user. Preferably a loop of elastic 22 is attached to the lower end 18 of each let 16 and extends around the arch of the user's shoe to hold the lower end 18 in abutment with the shoe. A knee opening 24 is formed at the knee of each leg and is covered with an insect excluding mesh 26 to provide ventilation and ease of flexing the knees. A loose fit is preferred between the clothing of the user and the leg 16 to provide a free flow of air into the knee opening 24 and upward around the body of the user for maximum comfort.

A pair of arms 28 of lightweight insect excluding material are provided and extend from the shoulders to the user's wrist. A space 30 is provided between the shoulder and the arm which is enclosed with insect excluding mesh to provide ventilation around the user's shoulder and armpits as well as provide freedom of movement for the arms. An elbow space 34 is also provided at the elbow of each arm which is covered with an insect excluding mesh 36 for ventilation at the elbow as well as for freedom of elbow motion. In a preferred embodiment, an elastic strip 38 is provided at the perimeter of the wrists to exclude insects from entering the garment 10 between the wrists and the arms of the user.

The insect proof coverall garment 10 further includes a hood 40 of lightweight insect excluding material joined to the body portion 12 at the neck. An opening 42 is provided for the face of the user, and the perimeter of the opening 42 is lined with VELCRO material 44 so that an insect excluding face covering mesh 46 may be releasably attached to the face opening 42 and allow the user to selectively open the face covering mesh 46 for eating, drinking, or other activities requiring access to the user's mouth.

The insect excluding material from which the coverall garment 10 is constructed may be selected from a large variety of materials including cotton, nylon, dacron, or a combination thereof depending upon costs and availability. The garment is preferably made large and loose fitting so that free ventilation around the user's body and a comfortable fit over the user's clothing may be achieved. Normally it is preferable that the material forming the garment have the ability to breath and expel moisture for reasons of comfort. However, ample ventilation is provided by the various openings provided at the joints of the garment and more durable fabrics may be used. In certain working environments, for example, it may be preferable to make the garment from heavier, more durable material which can be permitted because of the ample ventilation provided by the various openings.

The releasable fastener 14 which is provided for easy getting into and removal of the garment, may be a VELCRO fastener or may be a zipper type slide fastener of either plastic or metallic construction. The garment further includes a pair of slits 48 at pocket level for access to the user's inner garment and pockets. Flaps 50 are lined with VELCRO to releasably secure the slits closed and guard against the entry of insects or other small animals.

While a one-piece garment is preferred, the present invention can obviously be made in two or more pieces with the pieces secured together by VELCRO or slide fasteners or the like to exclude insects.

It can thus be seen that the present invention has provided a new and improved insect proof coverall garment which may be readily donned over the clothing of the user to protect the user from insects such as flies, mosquitoes and other small animals conveniently and without discomfort. The insect proof garment of the present invention is easy to use and very economical to produce and convenient to store in a compact, easily transported package.

It should be understood by those skilled in the art of insect proof garments that other forms of the Applicant's invention may be had, all coming within the spirit of the invention and the scope of the appended claims.

Having thus described my invention, What I claim is:

1. An insect proof garment comprising:
   a one-piece garment made from insect excluding fabric covering the limbs and body of the user;
   a hood of insect excluding material covering the user's head with the face portion covered with an insect excluding mesh releasably joined to said hood at the mesh perimeter; and
   the insect excluding material being removed from at least one of the limb joints of said garment and replaced with an insect excluding mesh to provide ventilation.

2. An insect proof garment comprising:
   a one-piece garment made from insect excluding fabric covering the limbs and body of the user;
   a hood of insect excluding material covering the user's head with the face portion covered with an insect excluding mesh releasably joined to said hood at the mesh perimeter; and
   the insect excluding fabric being removed at the knees and elbows of said garment and replaced with an insect excluding mesh to provide ventilation.

3. The insect proof garment as defined in claim 2 further comprising the insect excluding being fabric removed at the shoulders and armpits and replaced by an insect excluding mesh to provide ventilation.

4. The insect proof garment as defined in claim 3 wherein the hem of the garment legs abut the wearer's shoe, and a loop is provided to pass under the arch of the shoe to secure the leg hem to the shoe.

5. The insect proof garment as defined in claim 4 wherein the loop is made from elastic material.

6. The insect proof garment as defined in claim 2 further comprising a releasable fastener disposed along the garment front to aid in putting on an removing the garment.

7. The insect proof garment as defined in claim 6 wherein the releasable fastener is a zipper slide fastener.

8. The insect proof garment as defined in claim 6 wherein the releasable fastener is a VELCRO material.

9. An insect proof coverall garment comprising;
   a body portion of lightweight insect excluding material covering the user's body from the shoulders to the hips, a releasable fastener extending from the hips to the neck;
   a pair of legs of lightweight insect excluding material extending from the hips to the user's shoe tops, a loop of elastic disposed at a lower end of each leg and extending around the arch of the user's shoe to hold the lower end in abutment with the shoe, an opening formed at the knee of each leg, said opening covered with an insect excluding mesh for ventillation;
   a pair of arms of lightweight insect excluding material extending from the shoulders to the user's wrist, a space provided between the shoulder and the arm, said space covered with insect excluding mesh for ventillation, an elastic material disposed around the perimeter of the wrist to exclude insects, a space provided at the elbow covered with insect excluding mesh for ventillation;
   a hood of lightweight insect excluding material joined to the body portion at the neck, an opening provided for the face of the user, VELCRO material disposed around the perimeter of said opening to releasably attach an insect excluding face covering mesh to said hood for seeing and ventillation; and whereby the face covering mesh may be selectively removed for access to the user's mouth.

10. The insect proof garment as defined in claim 2 further comprising a pair of slits to provide access to the side pockets of the user's trousers, said slits including a flap lined with VELCRO material to releasably close the slit against insects.

* * * * *